United States Patent
Sage

(10) Patent No.: US 7,394,509 B2
(45) Date of Patent: Jul. 1, 2008

(54) BISTABLE DISPLAY DEVICE HAVING PLURAL CAVITIES CONTAINING ROTATABLE BICOLORED PARTICLES WITHIN A LIQUID CRYSTAL CARRIER

(75) Inventor: Ian Charles Sage, Malvern (GB)

(73) Assignee: Qinetiq Limited (GB)

( * ) Notice: Subject to any disclaimer, the term of this patent is extended or adjusted under 35 U.S.C. 154(b) by 158 days.

(21) Appl. No.: 10/549,050

(22) PCT Filed: Mar. 11, 2004

(86) PCT No.: PCT/GB2004/001049

§ 371 (c)(1),
(2), (4) Date: Sep. 13, 2005

(87) PCT Pub. No.: WO2004/081907

PCT Pub. Date: Sep. 23, 2004

(65) Prior Publication Data

US 2006/0176438 A1    Aug. 10, 2006

(30) Foreign Application Priority Data

Mar. 14, 2003  (GB) .................................... 0305856

(51) Int. Cl.
*G02F 1/1333* (2006.01)
(52) U.S. Cl. ........................................ 349/86; 359/296
(58) Field of Classification Search .................. 349/86; 359/296
See application file for complete search history.

(56) References Cited

U.S. PATENT DOCUMENTS

| 4,126,854 | A | 11/1978 | Sheridon |
| 4,143,103 | A | 3/1979 | Sheridon |
| 5,075,186 | A | 12/1991 | Sheridon |
| 5,262,098 | A | 11/1993 | Crowley et al. |
| 5,344,594 | A | 9/1994 | Sheridon |
| 5,389,954 | A | 2/1995 | Inaba et al. |
| 5,530,566 | A * | 6/1996 | Kumar ......................... 349/86 |
| 5,828,431 | A * | 10/1998 | Ando et al. ................... 349/86 |

(Continued)

FOREIGN PATENT DOCUMENTS

WO        WO 01/88607         11/2001

*Primary Examiner*—Andrew Schechter
*Assistant Examiner*—John Heyman
(74) *Attorney, Agent, or Firm*—McDonnell Boehnen Hulbert & Berghoff LLP

(57) ABSTRACT

A bistable display device comprises two cell walls enclosing a sheet having a plurality of cavities each containing a rotatable bicoloured sphere within a liquid crystal material carrier (15), and electrodes for applying an electrical field. The spheres and cavities are provided with a surface alignment which imposes a substantially unidirectional director alignment on the liquid crystal material in contact with them. The elastic distortion free energy of the liquid crystal material in each cavity is arranged to be zero when the preferred direction of the suspended spheres coincides with that of the surrounding cavity, e.g. black upwards. It is also zero when the sphere is rotated through 180° to present its opposite hemisphere which has a contrasting optical appearance, e.g. black downwards. Between these two states, there is an energetic barrier determined by the elastic constants of the liquid crystal which provides both a threshold for switching and improved bistability. During production of the sheet, alignment may be enhanced by application of an electric or magnetic field during curing or cooling of the components. The display may be addressed in a known multiplexed manner.

12 Claims, 1 Drawing Sheet

U.S. PATENT DOCUMENTS

| | | |
|---|---|---|
| 5,900,192 A | 5/1999 | Richley |
| 6,445,490 B1 | 9/2002 | Chopra |
| 6,618,114 B1 * | 9/2003 | Freeman .................... 349/187 |
| 2002/0015831 A1 | 2/2002 | Sheridon et al. |

* cited by examiner

BISTABLE DISPLAY DEVICE HAVING PLURAL CAVITIES CONTAINING ROTATABLE BICOLORED PARTICLES WITHIN A LIQUID CRYSTAL CARRIER

This invention concerns an electrically addressable display in which particles held in a matrix are rotated by an electric field, specifically a device having bistable switching.

A known device comprises an array of bi-coloured spheres suspended in liquid droplets in a plastic sheet. Opposite sides of the spheres carry different electric charges: under an applied field the spheres can be made to rotate, altering the apparent colour or reflectivity of the device. Magnetically actuated devices are also known. This device has been described as a "Gyricon" device; details are in U.S. Pat. Nos. 4,126,854, 4,143,103, 5,075,186, 5,262,098, 5,344,594, and 5,389,945 and are incorporated herein by reference.

Gyricon devices show little or no true threshold or bistability behaviour. The image once written is stable provided no field is applied, but the writing characteristics of the device make multiplex drive difficult. Complex devices must incorporate an active matrix drive circuit. This limits the utility of the technology for applications such as information display and electronic paper.

The problem of poor bistability and no true threshold are solved according to this invention by suspending the spheres in a liquid crystal material and surface treating the spheres and cavities to provide liquid crystal director alignment.

According to this invention a bistable display device comprises two cell walls enclosing a sheet having a plurality of cavities each containing a rotatable bicoloured particle within a liquid carrier, and electrodes for applying an electrical field, Characterised In That the liquid carrier is a liquid crystal material and the spheres together with the cavities are provided with a surface alignment which imposes a substantially unidirectional director alignment on the liquid crystal material in contact with them, whereby the particles have two switchable bistable states with an energy barrier between the two states.

The liquid crystal material is preferably a nematic material of either positive or negative dielectric anisotropy.

The spherical particles have a diameter of less than 10 µm, e.g. less than about 45 µm, typically about 10 µm.

The thickness of the sheet may be about 50 to 1000 µm.

The cell walls made be rigid glass or plastic, or thin flexible plastic material.

The invention will now be described, by way of example only, with reference to the accompanying drawings of which:

Figure 1:
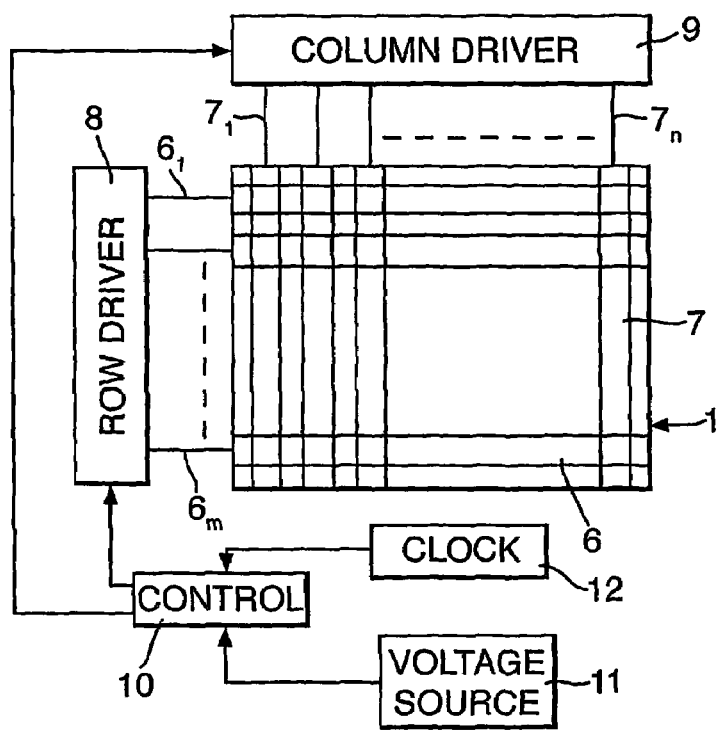
FIG. 1 is a plan view of a matrix multiplexed addressed display having spherical particles within a plastic sheet.
Figure 2:
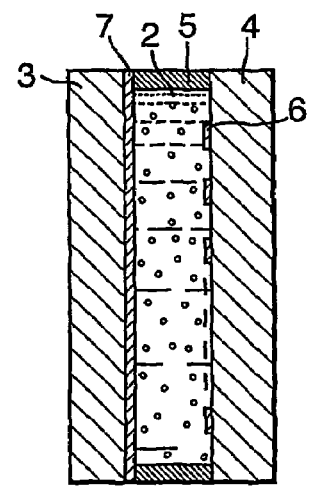
FIG. 2 is a cross section of the display of FIG. 1.

The display in FIGS. 1, 2 comprises a display cell 1 formed by a sheet 2 of plastic material contained between glass walls 3, 4 and (optionally) a spacer ring 5. The walls 3, 4 are typically 50-1000 µm apart, e.g. about 500 µm. Strip like row electrodes 6 e.g. of $SnO_2$ or ITO (indium tin oxide) are formed on one wall 4 and similar column electrodes 7 are formed on the other wall 3. With m-row and n-column electrodes this forms an m×n matrix of addressable elements or pixels. Each pixel is formed by the intersection of a row and column electrode. Either or both electrodes 6, 7 are optically transparent.

A row driver 8 supplies voltage to each row electrode 6. Similarly a column driver 9 supplies voltages to each column electrode 7. Control of applied voltages is from a control logic 10 which receives power from a voltage source 11 and timing from a clock 12.

The plastic sheet 2 is optically transparent and carries numerous spherical cavities 13 filled by spherically shaped particles 14 floating in a liquid crystal material 15 such as the nematic liquid crystal mixture E7, which is commercially available and which comprises a mixture of cyanobiphenyls and cyanoterphenyls of positive dielectric anisotropy. One side of each particle 14 is coloured differently to that of the other side; for example black on one side and white on the other. Other colour combinations may be used.

The particles 14 may be smooth or rough surfaced on both sides, or smooth on one side and rough on the other side. One side of the particles may be highly absorbing whilst the other is highly reflecting. Particles in a dielectric liquid acquire an electric charge related to the Zeta potential of their surface coating. Corresponding to the optical anisotropy of the particles, different surfaces present different Zeta potentials, with the result that the particles have an electrical anisotropy in addition to the optical anisotropy.

Figure 3:
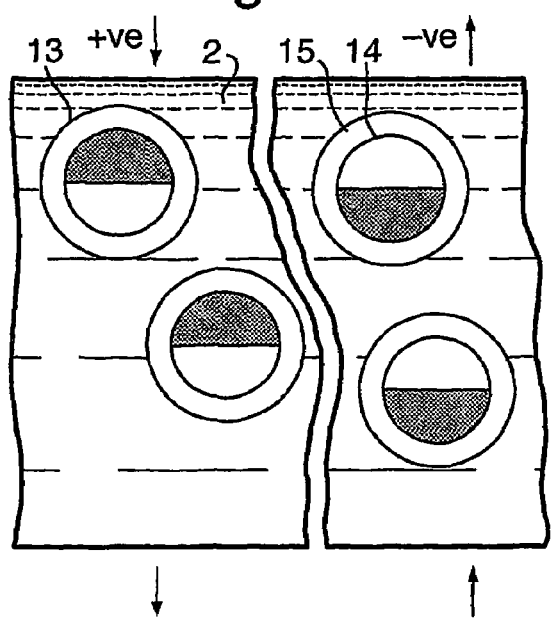
FIG. 3 is an enlarged cross section.

Application of an electrical field results in rotation of the spherical particles and a change in optical appearance. For example a positive field may produce black upwards (left hand side of FIG. 3) and a negative field produce white upwards (right hand side of FIG. 3). Thus by application of voltages to each row and column electrode in a multiplex addressing manner, each pixel in the display may be addressed to form a desired display pattern. Multiplexed addressing may be achieved by line at a time application of a voltage which exceeds the threshold voltage, to selected pixels of the device. Means to achieve this addressing, and to maintain the non-select error voltage on the device below the threshold voltage are well known to those skilled in the art.

The spheres may be produced as described in the prior art. For example by application of two differently pigmented plastic liquids to opposite sides of a spinning disk. Centrifugal force causes the two liquids to flow towards the periphery of the disk where they combine at the edge to form bichromal ligaments that eventually break up as bichromal spheres, i.e. optically anisotropic spheres. Alternatively, microspheres may be pre-formed and subsequently coated with a coloured material e.g. by directional vacuum deposition. The deposited material may simultaneously alter both the colour and the zeta potential of one hemisphere of each sphere. A suitable sphere may be obtained by evaporation of copper phthalocyanine pigment onto one hemisphere of polymer spheres composed of poly(methylmethacrylate) containing 15% of titanium dioxide pigment.

Prior to incorporation or after incorporation in the matrix sheet 2, the spheres are surface treated to give alignment to liquid crystal molecules. Such alignment may be achieved by forming them from an aligned liquid crystalline monomer mixture by thermal or UV polymerisation or crosslinking. An aligned liquid crystal polymer may also be provided as a surface coating on isotropic spheres by similar means. A suitable alignment may be achieved by coating the spheres with a ca. 100 nm layer of 4-cyano-4'-(3-methacryloylpropyloxy) biphenyl, placing them in a magnetic field of 5T aligned with the axis of optical anisotropy, and exposing the spheres to actinic light. A directional surface may also be achieved on spheres by forming or cooling them in suspension in an aligned liquid crystal, the spheres themselves being formed of an isotropic polymer. Alternatively known surface treatments may be applied such as deposited and patterned polymers and surfactants. Alternatively surface texturing may be applied to provide liquid crystal alignment.

The sheet 2 incorporating the spheres 14 may be formed by mixing the spheres with an uncured liquid elastomer and curing by thermal or UV polymerisation to give an alignment to liquid crystal material within the cavities 13. When cured, the sheet 2 is placed in a dielectric liquid plasticiser which is also a liquid crystalline material such as the E7 liquid crystal referred to above. After immersion for some time, the plasticiser becomes absorbed into the sheet, thereby swelling the sheet and filling the space between spheres 14 and cavity walls 13. The uncured liquid elastomer may be a commercially available silicone prepolymer such as Sylgard 184 or an epoxy prepolymer such as a bisphenol-A/epichlorhydrin condensate. Alternatively, the sheet 2 incorporating the spheres 14 may be formed by mixing the spheres with a soluble polymer dissolved in a solvent in which the spheres are substantially insoluble, and removal of the solvent. The sheet is then swollen with a liquid crystalline fluid as above.

The curing or solvent evaporation steps, as well as the swelling of the layer with a liquid crystalline fluid may be performed in a field, e.g., an electric field or a magnetic field which serve to impose a preferred alignment direction on a liquid crystal phase. Typically said alignment will also be imprinted on adjacent solid surfaces in the absence of a strongly anchoring alignment layer.

Optionally the polymer layer may be composed of a liquid crystalline polymer formed into a layer by curing or by solvent evaporation at such a temperature that the polymer is in an isotropic state. Subsequent cooling, optionally in an applied field, will impose directional order on the polymer and on solid surfaces in contact with it. Optionally such a liquid crystalline polymer may be formed on a substrate or between substrates treated to impose an alignment, e.g., a homeotropic alignment on the phase. The swelling of the layer may also be performed with a liquid crystalline fluid at such a temperature that it is in an isotropic state, and forms the liquid crystal state on cooling. Optionally a field may be imposed during this cooling stage. Fields, if applied, may be generated by known means including permanent or electromagnets, secondary electrodes connected to a high voltage, or by corona discharge.

Suitable liquid crystalline polymers include sidechain polymers based on siloxane, acrylate, methacrylate, poly(oxirane) and poly(oxetane) chains substituted with cyanobiphenyl, ester, biphenyl, azoxy, phenylcyclohexane and biphenylcyclohexane groups. Optionally a spacer unit is included between the liquid crystal sidegroup and the main polymer chain. Main chain liquid crystal polymers may also be used.

The cavity surface alignment together with that on each sphere imposes a substantially unidirectional director alignment on a liquid crystal in contact with them. The elastic distortion free energy of the liquid crystal material in each cavity is arranged to be minimised when the preferred direction of the suspended sphere coincides with that of the surrounding cavity, e.g. black upwards. It is also minimised when the sphere is rotated through 180° to present its opposite hemisphere which has a contrasting optical appearance, e.g. black downwards. Between these two states, there is an energetic barrier determined by the elastic constants of the liquid crystal which provides both a threshold for switching and improved bistability.

It is not necessary for a strictly unidirectional and uniform alignment to be achieved at each surface. For example, alignment of the liquid crystal to form defect pairs at defined points on the surface of the spheres, known as a Boojum configuration, and corresponding alignment on the interior of the droplets, will also suffice.

The invention claimed is:

1. A bistable display device comprising two cell walls enclosing a sheet having a plurality of cavities each containing a rotatable bicoloured particle within a liquid carrier and electrodes for applying an electrical field, wherein the liquid carrier is a liquid crystal material and the particles together with the cavities are provided with a surface alignment which imposes a substantially unidirectional director alignment on the liquid crystal material in contact with them, whereby the particles have two switchable bistable states with an energy barrier between the two states.

2. The device of claim 1 wherein the particles are of spherical form.

3. The device of claim 1 wherein the particles are of ellipsoidal form.

4. The device of claim 1 wherein the liquid crystal material is a nematic material of either positive or negative dielectric anisotropy.

5. The device of claim 1 wherein the spherical particles have a diameter of less than 100 µm, e.g. less than about 45 µm, typically about 10 µm.

6. The device of claim 1 wherein the spherical particles have a diameter of less than about 45 µm.

7. The device of claim 1 wherein the thickness of the sheet is 50 to 1000 µm.

8. The device of claim 1 wherein the cell walls are made of rigid glass or plastic, or thin flexible plastic material.

9. The device of claim 1 wherein the liquid crystal material is a material selected from the list containing nematic liquid crystal, smectic A liquid crystal, smectic C liquid crystal, chiral nematic liquid crystal.

10. The device of claim 1 wherein the sheet is formed of a liquid crystal sidechain polymer.

11. A method of manufacturing a bistable display device, the method comprising the steps of:
providing a sheet having a plurality of cavities, each containing a rotatable bicoloured particle within a liquid carrier;
enclosing the sheet between two cell walls; and
providing electrodes for applying an electrical field;
wherein the liquid carrier is a liquid crystal material and the particles and the cavities are provided with a surface alignment which imposes a substantially unidirectional director alignment on the liquid crystal material in contact with them, whereby the particles have two switchable bistable states with an energy barrier between the two states.

12. A method according to claim 11 in which the rotatable bicoloured particles are surface treated, to give the surface alignment to the liquid crystal materials, before incorporation of the particles in the sheet.

* * * * *